(12) United States Patent
Jones et al.

(10) Patent No.: US 6,871,796 B2
(45) Date of Patent: Mar. 29, 2005

(54) AIRCRAFT AND SPRAY BOOMS FOR AIRCRAFT

(75) Inventors: Peter Jones, St. George (AU); Graham Barrett, Orange (AU)

(73) Assignees: Jones Air PTY LTD, Queensland (AU); Spraycheck PTY LTD, New South Wales (AU)

( * ) Notice: Subject to any disclaimer, the term of this patent is extended or adjusted under 35 U.S.C. 154(b) by 278 days.

(21) Appl. No.: 10/205,889

(22) Filed: Jul. 26, 2002

(65) Prior Publication Data
US 2004/0016820 A1 Jan. 29, 2004

(51) Int. Cl.$^7$ ................................................ B64D 1/18
(52) U.S. Cl. ..................................................... 239/171
(58) Field of Search ............................... 239/159–167, 239/171, 176; 169/53; 244/136, 137 R, 129.5; 43/127, 900

(56) References Cited

U.S. PATENT DOCUMENTS

| | | | | |
|---|---|---|---|---|
| 2,659,624 A | * | 11/1953 | Harz | 239/164 |
| 2,979,273 A | * | 4/1961 | Liebhart | 239/550 |
| 3,933,309 A | * | 1/1976 | Odegaard | 239/171 |
| 4,437,630 A | * | 3/1984 | Jefferies | 244/136 |
| 5,501,398 A | * | 3/1996 | Davidson | 239/171 |
| 6,244,520 B1 | * | 6/2001 | Patchett | 239/114 |
| 6,622,966 B1 | * | 9/2003 | McConnell, Sr. | 244/136 |

* cited by examiner

Primary Examiner—David A. Scherbel
Assistant Examiner—Thach H. Bui
(74) Attorney, Agent, or Firm—Abelman, Frayne & Schwab

(57) ABSTRACT

An aerial spray boom 11 for an aircraft includes:
  an elongated housing 21 secured to the aircraft wing 12, the housing having one or more openings 22 along its length;
  a conduit 23 having a liquid supply passage 26 and a plurality of spaced-apart nozzles 27 that are aligned with, or extend through housing openings 22, conduit 23 being mounted in said housing for arcuate movement about its longitudinal axis through a prescribed arc that defines variable spraying positions; and
  a conduit actuator 31 operative connected to the conduit 23 that moves the conduit relative to the housing through an arc.

36 Claims, 12 Drawing Sheets

AIRCRAFT AND SPRAY BOOMS FOR AIRCRAFT

TECHNICAL FIELD OF THE INVENTION

Figure 1A:
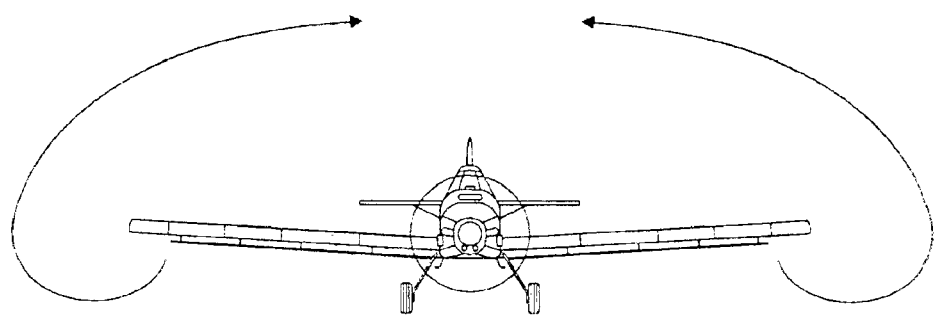
Figure 1B:
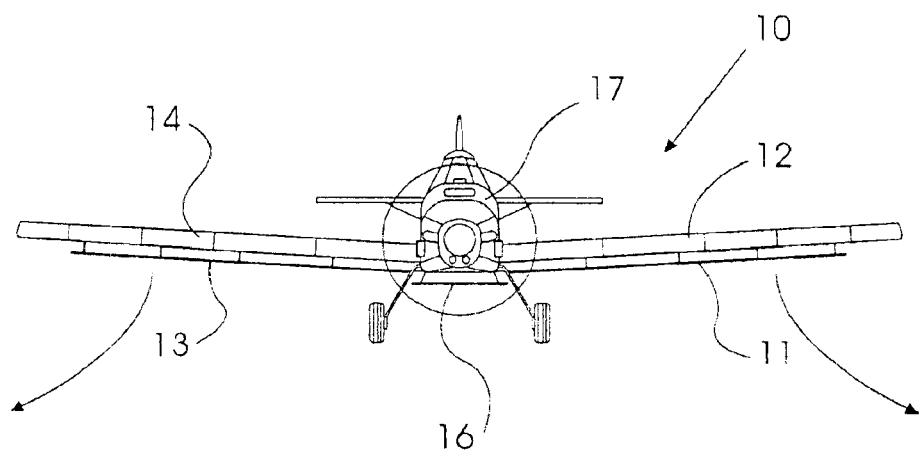

This invention relates to aircraft, spray booms for aircraft and components for spray booms as well as methods of spraying crops. The invention has particular application to aircraft and spray booms for aerial crop spraying but it will be appreciated that aspects of the invention may have application to ground spraying as well. However, for illustrative purposes reference will be made to aerial spraying only.

BACKGROUND ART

One of the problems of the presently available spray booms for aerial crop spraying is that they are generally not adjustable in flight. As a result, the pilot must select the boom and nozzles appropriate for the weather conditions at the time and set the nozzle angle and other parameters prior to take-off. In order to achieve reasonably efficient spraying, he must be able to accurately estimate wind speed, temperature and humidity at the crop location and. then set the spraying equipment to suit the estimate for those particular conditions. Even if a pilot is extremely accurate with his estimates, air conditions change over the spraying time and additionally aircraft speed generally increases as the payload decreases. Further, wind speed can differ substantially from a forward, run to a backward run. In this respect it will be appreciated that wind speed at the spray nozzles has a significant effect on droplet size which in turn affects drift and crop coverage. Another one of the problems associated with aerial crop spraying is that crosswinds have a significant effect on the spray deposition pattern due to the wing tip vortices.

One object of the present invention is to ameliorate one or more of the aforementioned problems. Another object is to provide spray booms which are more efficient in use. Another object is to provide a method of aerial spraying which allows for more effective crop coverage and less harmful drift and equipment for carrying out the method.

DISCLOSURE OF THE INVENTION

With the foregoing in view, the present invention in one aspect resides broadly in a spray boom for aerial spraying including:

an elongate housing adapted to be secured to the wing of an aircraft for use in aerial spraying and to extend at least partially along its length, and having an opening or a plurality of spaced apart openings in said housing substantially along its length;

an elongate conduit having a liquid supply passage therethrough and a plurality of spaced apart nozzles mounted thereto along its length and in fluid communication with said liquid supply passage, said elongate conduit being mounted in said housing for pivoting movement about its longitudinal axis through an arc defining different spraying positions in which said nozzles are aligned with or extend through said opening or said respective openings; and a conduit actuator operatively connected to said elongate conduit and adapted to move said elongate conduit relative to said housing through said arc.

Preferably, said arc extends from a forward position in which said nozzles face downwards and slightly forward in use, to a rearward position in which they face generally rearwards. Advantageously, in the downwards and slightly forward position, the wind shear at the nozzle is high which results in small droplets, that is say 80 microns VMD or less, while at the rearward position wind shear is minimised resulting in large droplets, perhaps up to 300 microns VMD and any size in between depending on the selected position in between. As will be appreciated, in some circumstances small droplets are preferred to achieve better leaf coverage, while in others, large droplets are preferred to minimise drift. Suitably, said actuator is operable in flight so that the pilot may vary the position of the conduit to optimise the spray to suit the wind conditions at any time. For this purpose it is preferred that a controller be mounted in the cockpit or be at least operable from the cockpit and accessible by the pilot and operatively connected to said actuator. In a preferred form the actuator is a pneumatic actuator.

Preferably, said elongate housing is generally aerofoil in cross-sectional shape and surrounds said conduit. It is also preferred that the elongate housing be adapted to be mounted to the aircraft in position parallel to the aircraft wing so as to act in the normal aerofoil manner. In such form, the aerofoil is preferably provided with individual openings for the respective nozzles.

Preferably, the spray boom includes a flow control valve at a predetermined position along its length whereby said liquid supply passage may be closed if desired so that only some of the boom and thereby only some of the nozzles are supplied with liquid in use. Advantageously, such arrangement assists in decreasing the problems associated with wing tip vortices by closing an outer portion of the liquid supply passage. It is also preferred that said flow control valve be operable in flight so that the pilot may shut down part of the boom in order to limit downwind spray deposition or to lessen the effect of propellor wash while spraying in some conditions or travelling in some directions.

In another aspect the invention resides broadly in a spray boom for aerial spraying including:

an elongate conduit having a liquid supply passage therethrough and a plurality of spaced apart nozzles mounted thereto along its length and in fluid communication with said liquid supply passage, and a flow control valve at a predetermined position along said elongate conduit for controlling flow of liquid through said liquid supply passage to a selected portion of said boom;

a valve actuator operatively connected to said flow control valve for opening and closing said valve, and a controller operatively connected to said valve actuator and remote therefrom for controlling said valve actuator. Suitably, said controller is operable in flight so that the pilot may open and close the flow control valve to open or shut down part of the boom as desired. For this purpose it is preferred that the controller be mounted in or at least operable from the cockpit and accessible by the pilot and operatively connected to said actuator. In a preferred form the actuator is a pneumatic actuator.

In another aspect the invention resides in an aircraft for aerial spraying including:

a first spray boom and a second spray boom, each of said spray booms including an elongate housing having an opening or a plurality of spaced apart openings substantially along its length, and an elongate conduit having a liquid supply passage therethrough and a plurality of spaced apart nozzles mounted thereto along its length and in fluid communication with said liquid supply passage, said elongate conduit being mounted in said housing for pivoting movement about its longitudinal axis through an arc defining different spraying positions in which said nozzles are aligned with or extend through said opening or said openings, and a conduit actuator operatively connected to said elongate conduit and adapted to move said elongate conduit relative to said housing through said arc, said first elongate housing being secured to one wing of the aircraft and extending substantially along its length and said second elongate housing being secured to the other wing and extending substantially along its length; and a controller mounted in or at least operable from the cockpit of the aircraft and operatively connected to said conduit actuator for controlling said conduit actuator.

In another aspect the invention resides in an aircraft for aerial spraying including:

a first spray boom and a second spray boom, each of said spray booms including an elongate conduit having a liquid supply passage therethrough and a plurality of spaced apart nozzles mounted thereto along its length and in fluid communication with said liquid supply passage, and a flow control valve at a predetermined position along said elongate conduit for controlling flow of liquid through said liquid supply passage to a selected portion of said boom, and a conduit actuator operatively connected to said flow control valve for opening and closing said valve, said first spray boom being secured to one wing of the aircraft and extending substantially along its length and said second spray boom being secured to the other wing and extending substantially along its length;

a controller operable from the cockpit of the aircraft operatively connected to said valve actuator for controlling said valve actuator.

In another aspect the invention resides in an aircraft for aerial spraying including:

a first spray boom, a second spray boom and a third spray boom, each of said spray booms including an elongate conduit having a liquid supply passage therethrough and a plurality of spaced apart nozzles mounted thereto along its length and in fluid communication with said liquid supply passage, said first spray boom being secured to one wing of the aircraft and extending substantially along its length, said second spray boom being secured to the other wing and extending substantially along its length and said third spray boom being mounted below the fuselage of the aircraft and extending generally across its width;

a flow control valve operatively connected to the elongate conduit of said third spray boom for controlling flow of liquid to said third boom and a conduit actuator operatively connected to said flow control valve for opening and closing said valve;

a controller operable from the cockpit of the aircraft operatively connected to said valve actuator for controlling said valve actuator. Advantageously, the pilot may operate the flow control valve to open or close the third spray boom as desired to lessen some of the problems associated with propellor wash.

In yet another aspect the invention resides broadly in an aircraft including:

a first spray boom and a second spray boom, each of said spray booms including an elongate housing having an opening or a plurality of spaced apart openings substantially along its length, and an elongate conduit having a liquid supply passage therethrough and a plurality of spaced apart nozzles mounted thereto along its length and in fluid communication with said liquid supply passage, said elongate conduit being mounted in said housing for pivoting movement about its longitudinal axis through an arc defining different spraying positions in which said nozzles are aligned with or extend through said opening or said openings, and a flow control valve at a predetermined position along said elongate conduit for controlling flow of liquid through said liquid supply passage to a selected portion of said boom, and a conduit actuator operatively connected to said elongate conduit and adapted to move said elongate conduit relative to said housing through said arc, and a valve actuator operatively connected to said flow control valve for opening and closing said valve, said first elongate housing being secured to one wing of the aircraft and extending substantially along its length and said second elongate housing being secured to the other wing and extending substantially along its length;

a controller operable from the cockpit of the aircraft operatively connected to said conduit actuator and said valve actuator for controlling said conduit actuator and said valve actuator.

Preferably the control valve actuator is a linear actuator which is located adjacent one end of the conduit and is connected to the flow control valve by an actuator shaft or rod mounted within the conduit. In such form it is preferred that the flow control valve includes a valve member mounted in a housing and adapted to move linearly in the direction of the conduit axis to engage and disengage with a seat in the housing to shut and open the flow passage.

Preferably, the aircraft also includes a third spray boom which is mounted under the fuselage and is of the type previously described and the third spray boom is mounted via its respective elongate housing as with the first and second spray booms. In a preferred form the controller is adapted to control the valve actuators and the conduit actuators of all spray booms. In a still more preferred form the controller is operated by computer software in response to data derived from a ground positioning system, weather parameters such as wind speed and direction, humidity and temperature, and pilot input if desired to control the operation of the flow control valves and the conduit actuators. Advantageously, the computer software uses true wind speed as one of the parameters so that the angle of the conduit can be adjusted to maintain constant wind shear at the nozzles and thereby maintain constant droplet size.

In still yet another aspect the invention resides broadly in a method of controlling aerial crop spraying with an aircraft having first, second and third booms as previously described, including:

providing data relating to performance criteria of the nozzles of said first, second and third booms over a range of nozzle angles and true wind speed;

selecting a desired nozzle performance;

measuring true wind speed of the aircraft before or during spraying;

determining the nozzle angle required to achieve the desired nozzle performance at the measured wind speed; and adjusting the angle of the conduit to the angle determined.

In yet another aspect the invention resides broadly in a method, of controlling aerial crop spraying with an aircraft having first, second and third booms as previously described, including:

determining the direction of the cross wind; and maintaining the flow control valve of said third spray boom open while the aircraft is travelling in one direction and maintaining it closed, while travelling in the other direction. Preferably, the method includes automatically opening and closing said flow control valve in response to the aircraft turning through a predetermined. angle as the case may be. Suitably, such opening and closing may be in response to data received from a ground positioning system.

In still yet another aspect the invention resides broadly in a computer program for carrying out either or both of the methods previously described. In one form the computer program includes:

means for selecting a desired nozzle performance from a first data structure representing performance criteria of a nozzle of at least one of said first and second spray booms (and third spray boom where provided) for a range of nozzle angles and true wind speeds;

means for determining the nozzle angle required to achieve the desired nozzle performance at a measured true wind speed from said first data structure; and means for causing the conduit actuator of said spray boom to adjust the angle of said spray boom to achieve the nozzle angle determined to achieve the desired nozzle performance.

In another form the computer program includes:

means for inputting a selected direction of travel of the aircraft;

means for inputting a predetermined deviation of the aircraft from the selected direction; and means for causing the valve actuator of one or both of said first and second spray booms to open or close in response to a deviation from the selected direction by at least the predetermined deviation.

In another form the computer program includes:

means for inputting a selected direction of travel of the aircraft;

means for inputting a predetermined deviation of the aircraft from the selected direction; and means for causing the valve actuator of said third spray boom to open or close in response to a deviation from the selected direction by at least the predetermined deviation.

In another form the computer program includes:

means for inputting a selected direction of travel of the aircraft;

means for inputting a predetermined deviation of the aircraft from the selected direction; and means for causing the valve actuator of one or both of said first and second spray booms to open or close in response to a deviation from the selected direction by at least the predetermined deviation; and means for causing the valve actuator of said third spray boom to open or close in response to a deviation from the selected direction by at least the predetermined deviation.

Preferably the computer program includes means for receiving and processing data from a ground positioning system so that the direction of travel and deviation from the direction of travel can be determined by reference to data received from the ground positioning system.

In another aspect the invention resides broadly in an aircraft having one or more conduit actuators, one or more valve actuators and a computer program as previously described controlling said conduit actuators and said valve actuators.

THE DESCRIPTION OF THE DRAWINGS

In order that the invention may be more easily understood and put into practical effect, the invention will now be described with reference to the accompanying drawing, wherein:

FIG. 1*a* is a front elevation of a typical aircraft used for aerial spraying showing diagrammatically the downwind spray pattern due to the upwind wing tip vortice;

FIG. 1*b* is a front elevation of an aircraft according to the invention showing diagrammatically the effect of shutting off part of the upwind spray boom on the spray;

FIG. 2*a* is a pictorial representation of a first spray boom and part of a second spray boom and associated pipework according to the invention;

FIG. 2*b* is a plan view of one wing of an aircraft and part of the fuselage with a first and third spray boom according to the invention attached;

FIG. 2*c* is a pictorial representation of part of the wing and fuselage of FIG. 2*b;*

FIG. 2*d* is a rear elevation of the part wing and fuselage of FIG. 2*b;*

FIG. 2*e* is a detailed rear elevation of the third spray boom and fittings of the aircraft shown. in part in FIG. 2*b* which is encircled in FIG. 2*d;*

FIG. 2*f* is a pictorial representation of part of the third boom assembly shown in FIG. 2*b* with some parts removed for clarity;

FIG. 2*g* is an end elevation of the third spray boom shown in FIG. 2*b* and part of the fuselage with some parts removed for clarity;

FIG. 2*h* is a pictorial representation of the third spray boom shown in FIG. 2*b* with some parts removed for clarity;

FIG. 2*j* is a plan view of the first spray boom of the aircraft shown in FIG. 2*b;*

FIG. 2*k* is a sectional elevation of the first spray boom of FIG. 2*j* along line 2*k*—2*k;*

FIG. 2*l* is a diagrammatic sectional end elevation of the first spray boom shown in FIG. 2*j* with some parts removed for clarity with the nozzle in the almost downward position;

FIG. 2*m* is a plan view of part of the first spray boom shown in FIG. 2*j* showing a detailed view of the nozzle aperture through the aerofoil housing;

FIG. 2*n* is a plan view of detail D;

FIG. 2*p* is a plan view of detail A;

FIG. 2*q* is a plan view of detail C;

FIG. 3*a* is a pictorial representation of the valve assembly shown in FIG. 2*n;*

FIG. 3*b* is a sectional elevation of the valve assembly of FIG. 3*a* along line 3b—3b in the open position;

FIG. 3*c* is a sectional elevation of the valve assembly of FIG. 3*a* along line 3b—3b in the closed position;

FIG. 4*a*is a pictorial representation of a pneumatic actuator for actuating the valve shown in FIG. 3*a;*

FIG. 4*b* is an elevation of the actuator of FIG. 4*a;*

FIG. 4*c* is a sectional elevation of the actuator of FIG. 4*a* along line A—A.

DETAILED DESCRIPTION OF THE DRAWINGS

The aircraft 10 illustrated in FIG. 1*b* includes a first spray boom 11 attached, to one wing 12, a second spray boom 13 attached to the other wing 14, and a third spray boom 15 attached to the fuselage 17.

Each spray boom includes a housing 21 of aerofoil shape in cross-section which has a plurality of spaced apart slots 22 therein and extending through approximately the rearmost lower quarter of the housing. The terms "upper", "lower", "forward", "rearward" and the like are used herein to describe the various integers in their normal in-use position and are not intended to limit the invention to any particular orientation.

A liquid supply conduit 23 is mounted in the housing for pivoting movement relative thereto about its longitudinal axis 24 to an angle of approximately 110 degrees. A liquid flow passage 26 extends through the liquid supply conduit and is in liquid communication with a plurality of spaced apart nozzles 27 mounted to the conduit. As can be seen from FIG. 2l, the liquid supply conduit is adapted for pivoting movement, that is, partial rotation within the housing through an arc of approximately 110 degrees so that the nozzles can be moved into any spraying position between a frontmost position in which the nozzles are slightly forward of vertically down in use, to a rearmost position in which the nozzles are facing generally horizontally in the direction opposite to flight. As can be more clearly seen in FIG. 2k, the conduit is mounted in spaced apart bearing assemblies 28 which locate between inwardly extending ribs provided in the aerofoil housing, to facilitate pivoting.

Figure 2A:
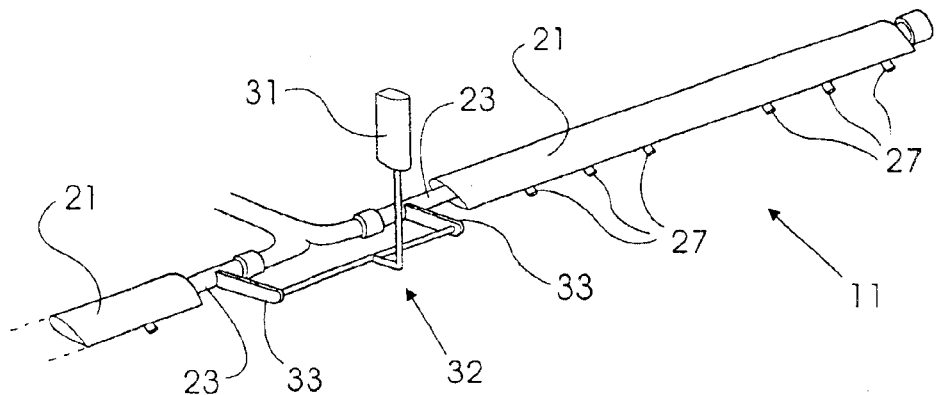
Figure 2B:
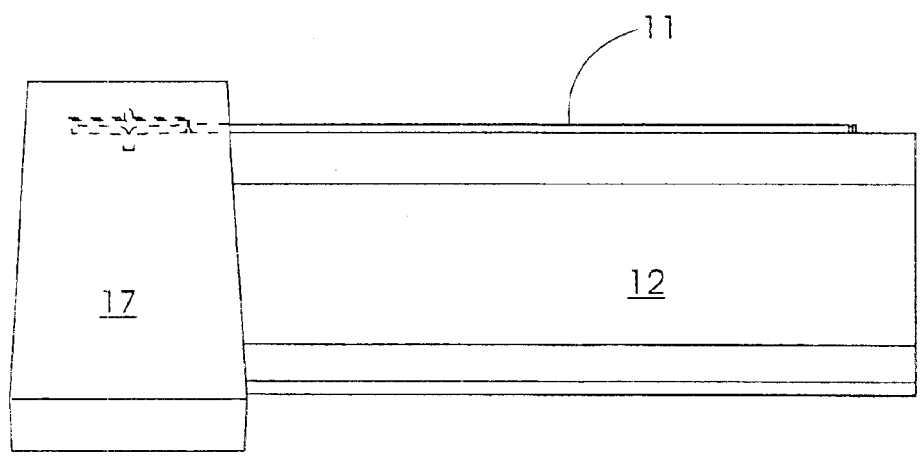
Figure 2C:
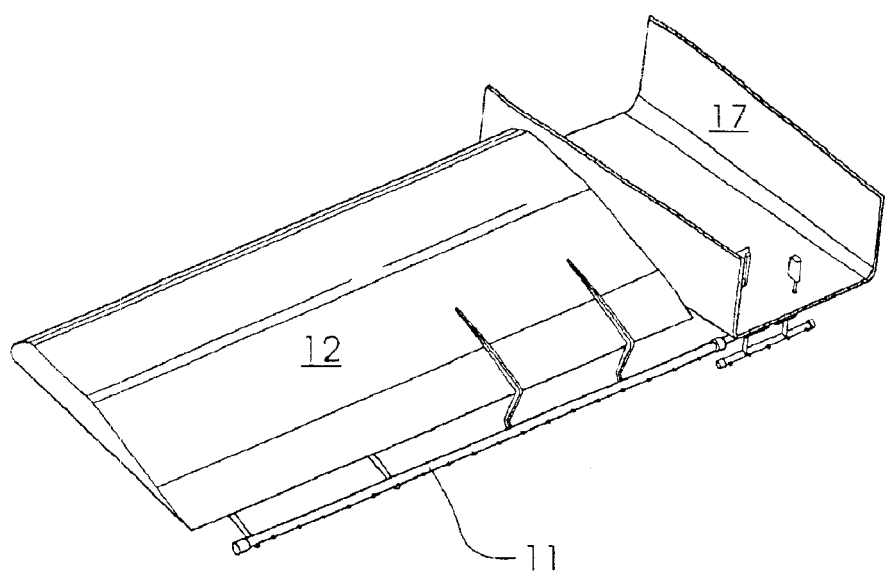
Figure 2D:
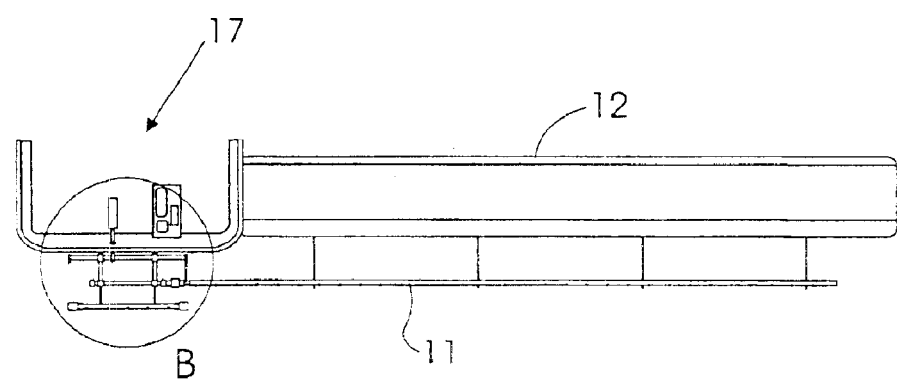
Figure 2E:
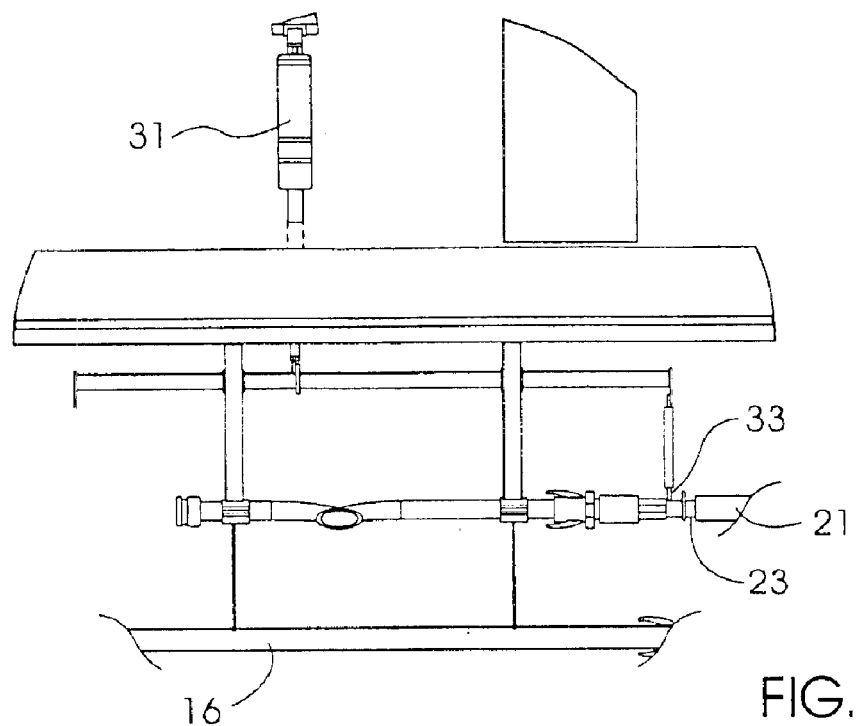
Figure 2G:
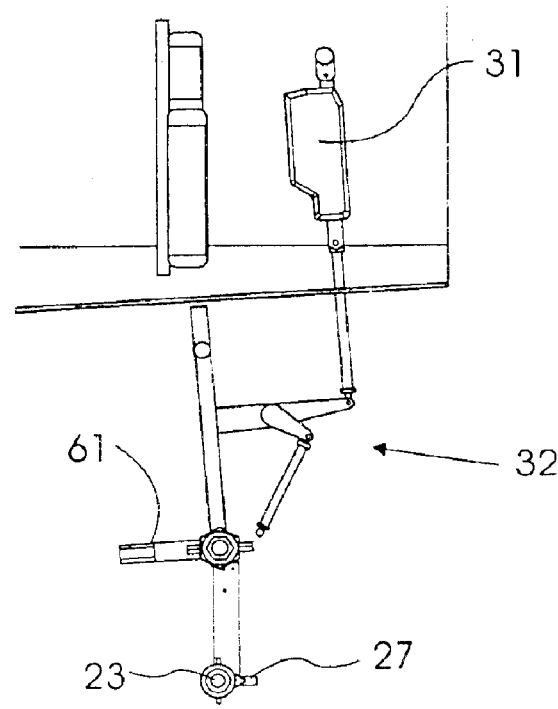
Figure 2F:
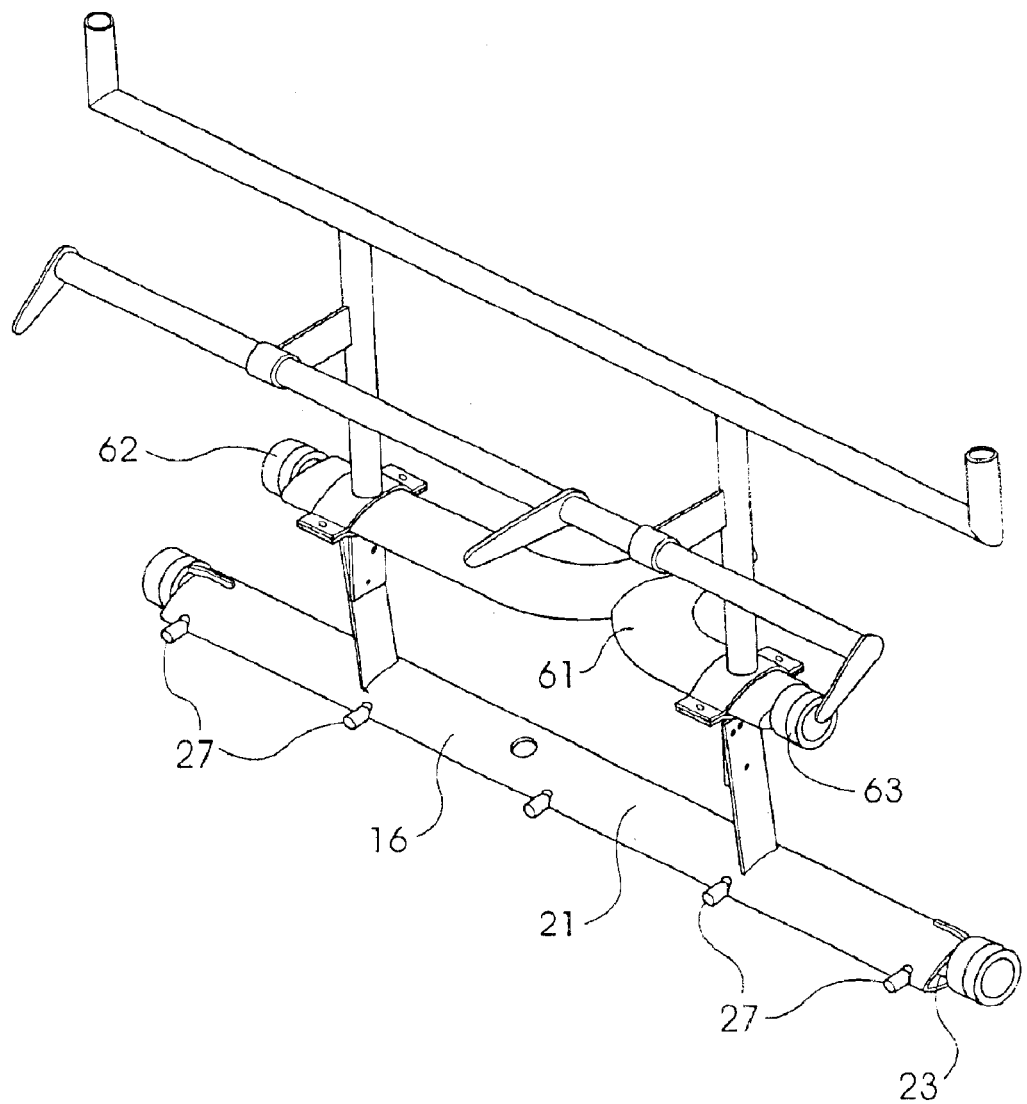
Figure 2H:
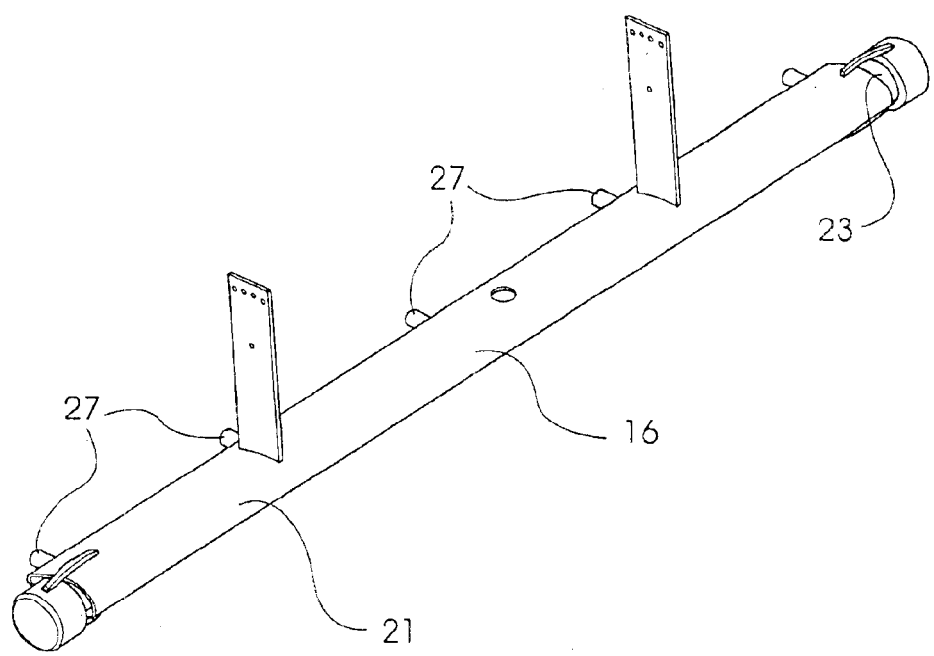
Figure 2J:
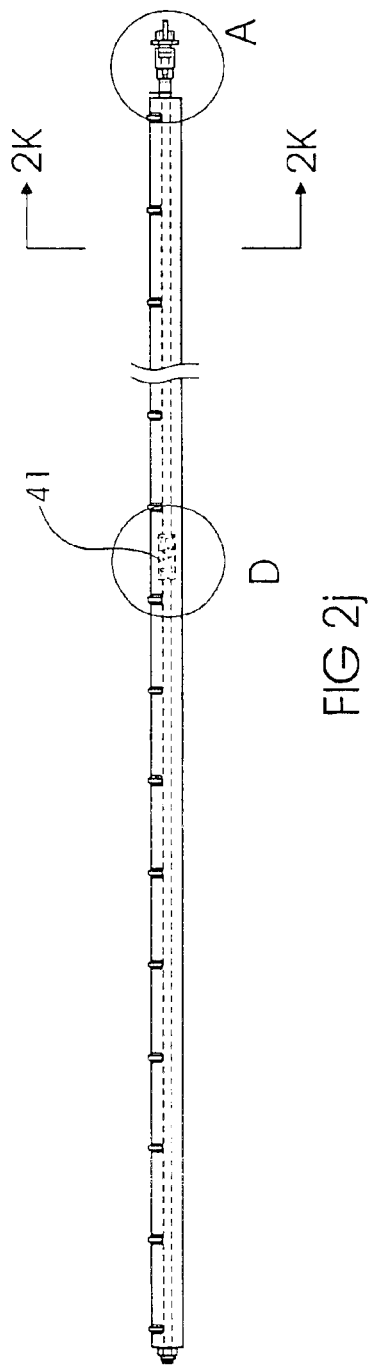
Figure 2K:
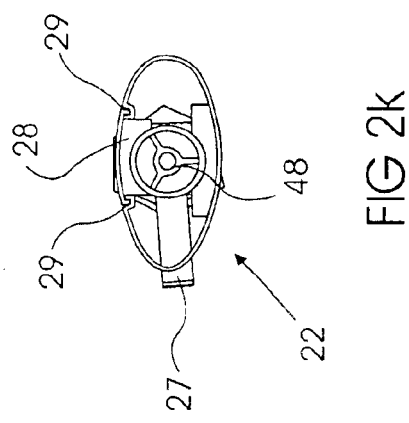
Figure 2L:
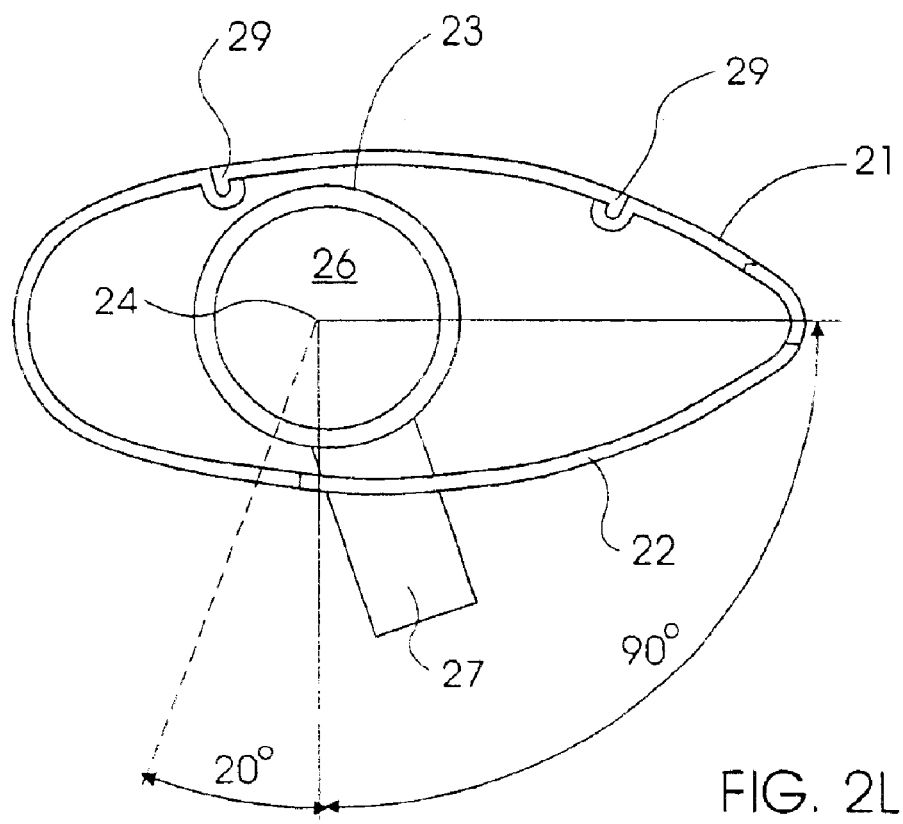
Figure 2M:
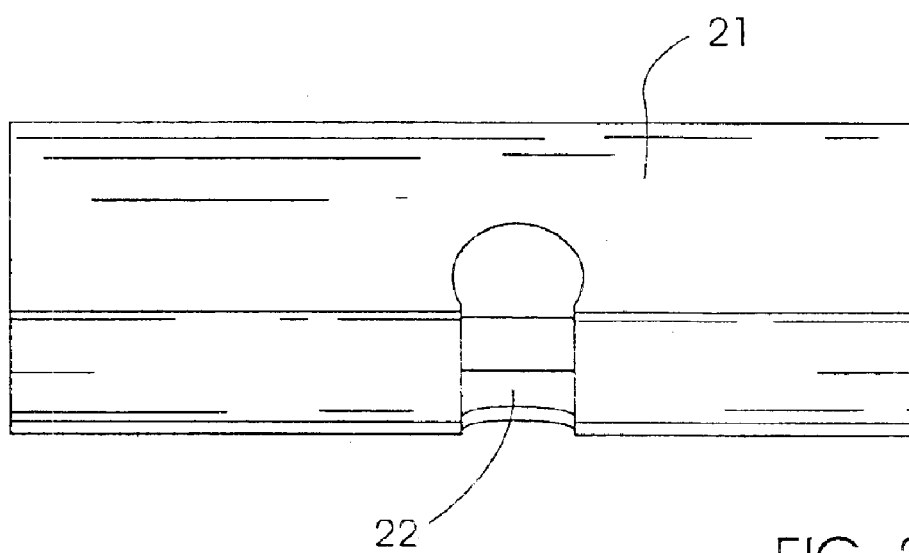
Figure 2N:
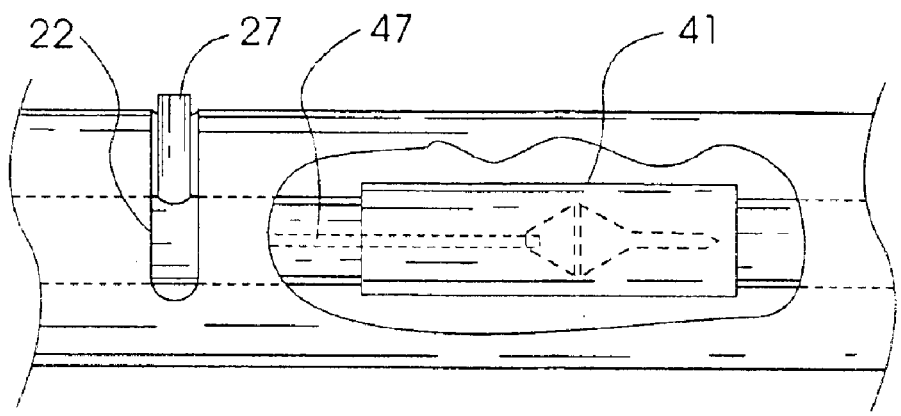
Figure 2P:
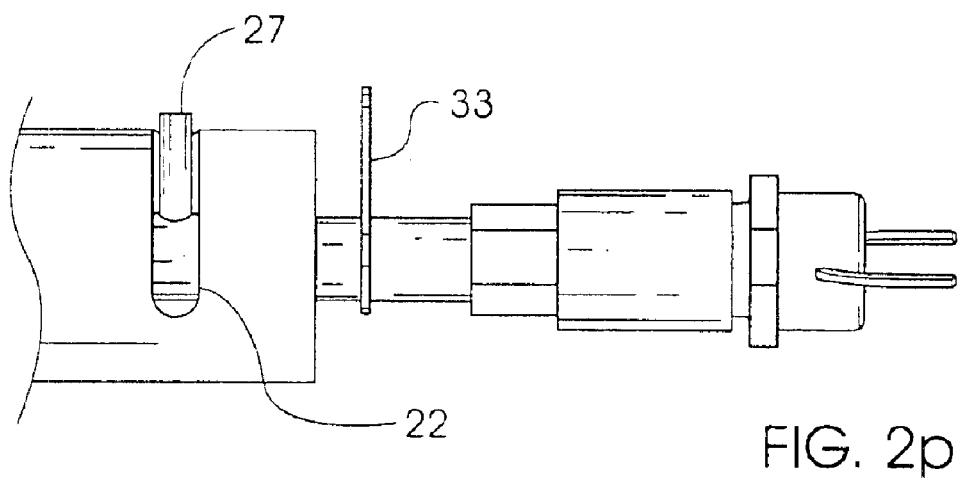
Figure 2Q:
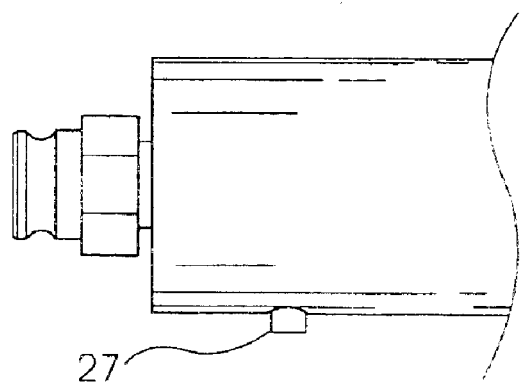

Pivoting movement of the fluid supply conduit 26 relative to the housing 21 which can be seen in FIGS. 2e and 2g, is achieved by an pneumatic actuator 31 which is mounted in the cockpit 17 and connected to the liquid supply conduit by a linkage assembly 32 and a crank arm 33 as can be seen in FIG. 2p. It will be appreciated from FIG. 2e, that the single actuator 31 is arranged to move the liquid supply conduit of both the first and second spray booms. However, in another embodiment, separate actuators are used although they are generally controlled by a single controller. Pivoting movement of the liquid supply conduit of the third spray boom 16, is achieved in the same manner, although the various components are not clearly shown in the drawings. Likewise, the liquid supply conduit of the third spray boom can be actuated by an independent actuator or it can be connected to actuator 31 by a suitable linkage assembly.

Figure 3A:
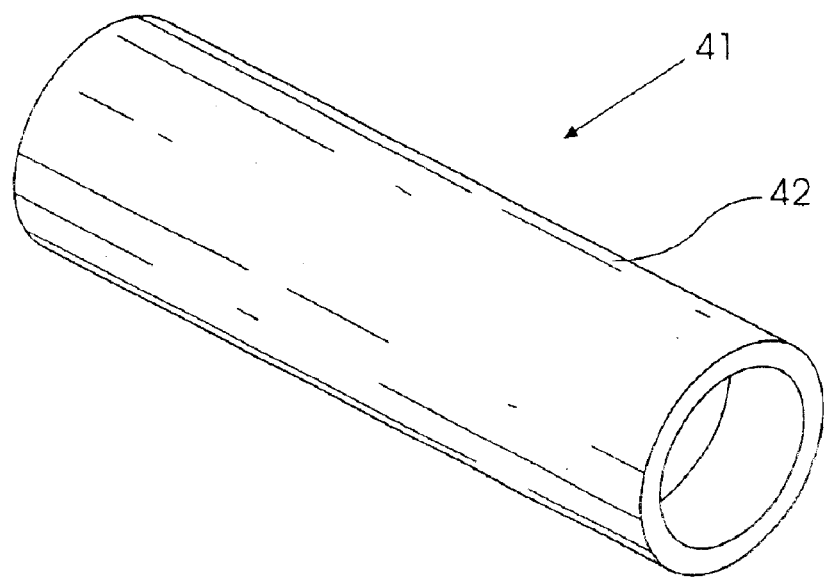
Figure 3B:
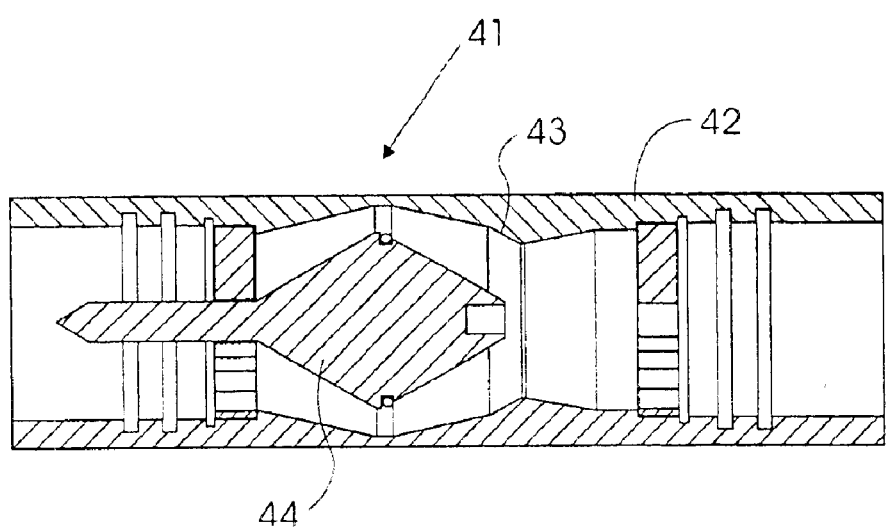
Figure 3C:
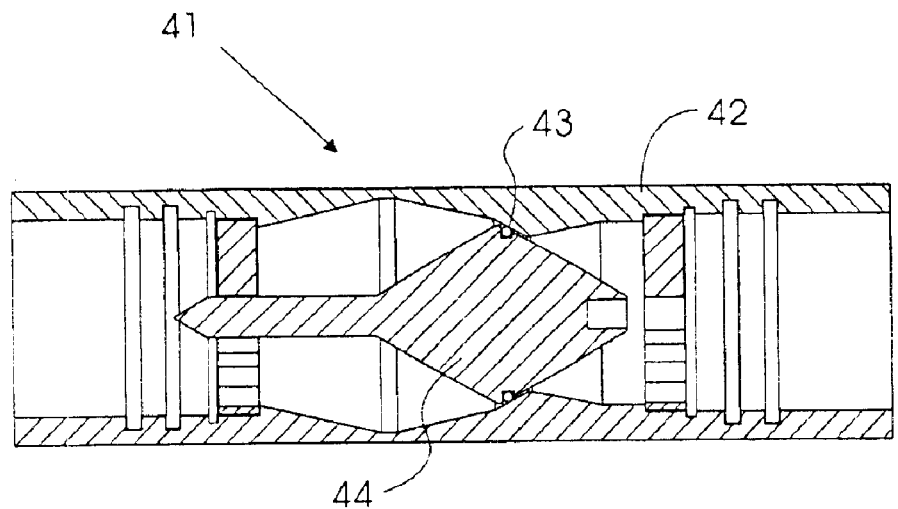
Figure 4A:
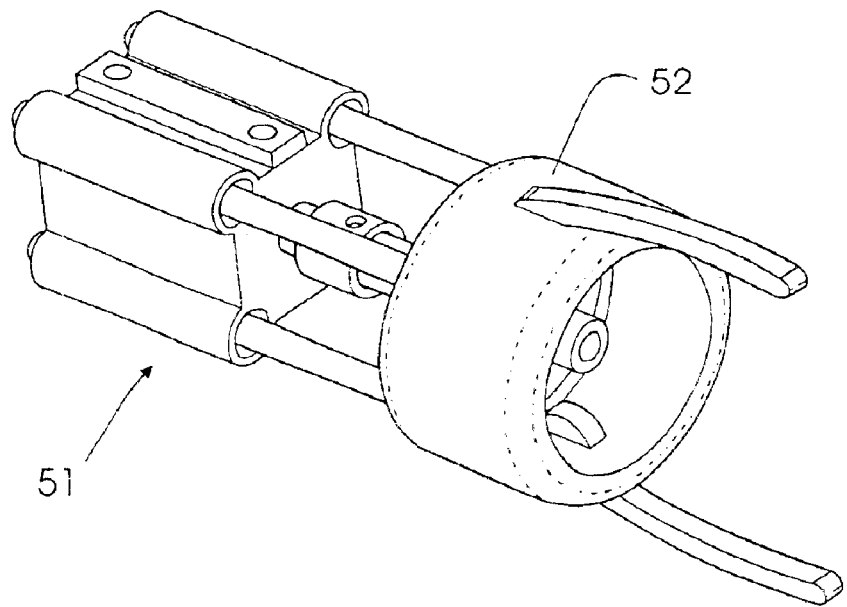
Figure 4B:
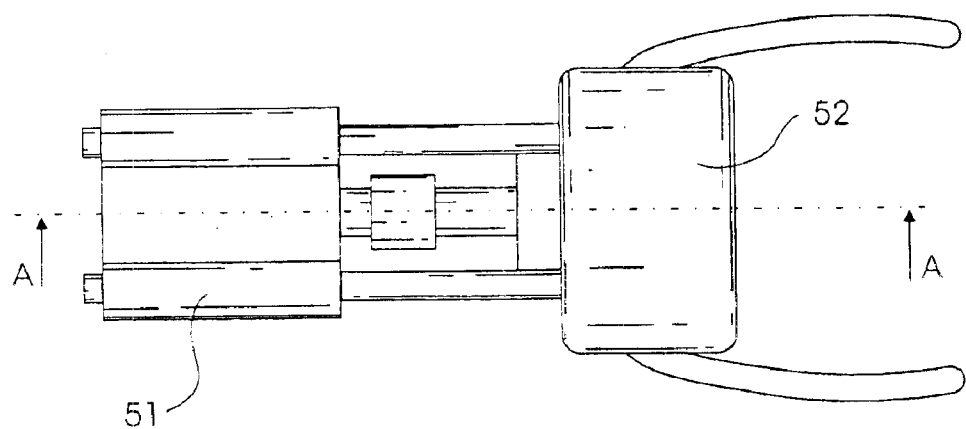
Figure 4C:
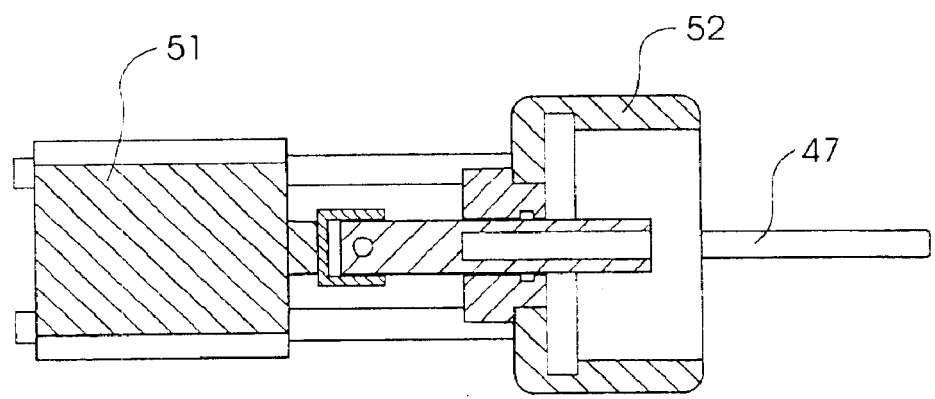

Each of the first and second spray booms 11 and 13, have an in-line flow control valve 41 connected in the respective liquid supply conduits slightly further than half way along, the valve being adapted to shut off the outermost portion of each conduit as desired in order to lessen the effect of upwind wing vortice. Each control valve has a housing 42 with a valve seat 43 therein as can be seen in FIG. 3b, and a linear valve member 44 which is adapted to engage with the seat upon a predetermined linear movement. The valve member is connected to a pneumatic actuator 51 shown in FIG. 4a which is connected to the outermost end of the liquid supply conduit. The actuator is connected to the valve member by a connecting rod 47 which is supported in spaced apart bearings 48 which can be seen in FIG. 2k. Advantageously, the valve assembly is adapted to offer only low resistance to flow therethrough while at the same time having an outer diameter which is substantially the same as the liquid supply conduit and can be easily accommodated within the aerofoil housing 21. It will be seen that the actuator is connected to the liquid supply conduit by a cam-lock fitting 52.

Supply of liquid to the first and second spray booms, is achieved through a T-shaped manifold which itself is housed in an aerofoil shaped housing to reduce drag, and connected at the opposite ends of the T to the first and second spray boom by cam-lock fittings 62 and 63 which are adapted to allow pivoting movement of the liquid supply conduits 23 relative thereto. The inlet end of the manifold is in turn connected to the supply tank in the fuselage 17 through a known control valve system which is typically controlled in, response to a signal from a ground positioning system.

The third spray boom is connected to the supply tank in the fuselage by another supply conduit (not shown) via a control valve (also not shown) and is controlled independently of the first and second spray booms. Advantageously, the separate controls allows the third spray boom to be shut down as desired to minimise propeller wash depending on wind direction.

In use, the pilot, in consultation with an agronomist if desired, determines the appropriate spray droplet size for the particular crop, weeds, insects, weather, or other parameters. The pilot determines the true air speed of the aircraft in flight at the spray location and selects the angle of the nozzle required to achieve the desired droplet size at the particular true air speed. He then sets the nozzles at the desired angle by pivoting the liquid supply conduits of the three booms in flight to achieve the desired droplet size by activating the actuator 31 to pivot the liquid supply conduits 23 to the desired angle. The actuator for the third spray boom is activated in a similar manner in this embodiment. In a more preferred embodiment, the actuator 31, or all actuators if each boom has its own actuator, is controlled by computer software which determines the optimum angle for the nozzles in response to various inputs including desired droplet size, true wind speed, ambient temperature and humidity and other parameters as desired. Where software is provided it may control the valve actuators 51 to shut off the outermost portions of the respective first and second spray booms in response to an input depending on the direction of travel. That is to say, in conditions where the upwind wing tip vortice causes undesirable spray deposition, the outermost portion of the upwind spray boom may be shut off as the plane turns for a run in one direction or the other, the input signal being derived from a ground positioning system. In a similar manner, the flow of liquid to the third spray boom may be turned on or off to limit the undesirable effects of propeller wash in one direction or the other Again, the flow control valve for the third, spray boom may be actuated in response to a signal from the computer system based on data received from a ground positioning system, or manually if desired.

The foregoing description has been given by way of illustrative example of the invention, and many modifications and variations which will be apparent to persons skilled in the art may be made without departing from the spirit and scope of the invention as defined in the appended claims.

What is claimed is:

1. A spray boom for aerial spraying including:
    an elongate housing adapted to be secured to the wing of an aircraft for use in aerial spraying and to extend at least partially along its length, and having an opening or a plurality of spaced apart openings in said housing substantially along its length;
    an elongate conduit having a liquid supply passage therethrough and a plurality of spaced apart nozzles mounted thereto along its length and in fluid communication with said liquid supply passage, said elongate conduit being mounted in said housing for pivoting movement about its longitudinal axis through an arc defining different spraying positions in which said nozzles are aligned with or extend through said opening or said respective openings; and a conduit actuator operatively connected to said elongate conduit and adapted to move said elongate conduit relative to said housing through said arc.

2. A spray boom according to claim 1, wherein said arc extends from a forward position in which said nozzles face downwards and slightly forward in use, to a rearward position in which they face generally rearwards.

3. A spray boom according to claim 1, wherein said actuator is adapted to be operable in flight whereby the angular position of said conduit may be varied in flight.

4. A spray boom according to claim 3, wherein said actuator is adapted to be controlled by a controller operable from the cockpit of the aircraft to which the spray boom is secured.

5. A spray boom according to claim 4, wherein said actuator is a pneumatic actuator.

6. A spray boom according to claim 1, wherein said elongate housing is generally aerofoil in cross-sectional shape and surrounds said conduit.

7. A spray boom according to claim 6, wherein said elongate housing is adapted to be mounted to an aircraft in a position parallel to the aircraft wing with the leading edge of the aerofoil facing forward.

8. A spray boom according to claim 1, including a flow control valve at a predetermined position along its length.

9. A spray boom according to claim 8, wherein said flow control valve is adapted to selectively shut off liquid supply to part of the boom.

10. A spray boom according to claim 9, wherein said flow control valve is adapted to be operable in flight.

11. A spray boom according to claim 10, wherein said flow control valve is adapted to be controlled by a controller accessible from the cockpit of the aircraft to which the spray boom is secured.

12. A spray boom for aerial spraying including:
    an elongate conduit having a liquid supply passage therethrough and a plurality of spaced apart nozzles mounted thereto along its length and in fluid communication with said liquid supply passage, and
    a flow control valve at a predetermined position along said elongate conduit for opening and closing said passage and thereby controlling the flow of liquid through said liquid supply passage to a selected downstream portion of said boom;
    a valve actuator operatively connected to said flow control valve for opening and closing said valve, and
    a controller operatively connected to said valve actuator and remote therefrom for controlling said valve actuator.

13. A spray boom according to claim 12, wherein said controller is adapted to be operable in flight.

14. A spray boom according to claim 13, wherein said controller is adapted to be operated from the cockpit of the aircraft to which the spray boom is secured.

15. A spray boom according to claim 12, wherein said actuator is a pneumatic actuator.

16. An aircraft for aerial spraying including:
    a first spray boom and a second spray boom, each of said spray booms including an elongate housing having an opening or a plurality of spaced apart openings substantially along its length, and an elongate conduit having a liquid supply passage therethrough and a plurality of spaced apart nozzles mounted thereto along its length and in fluid communication with said liquid supply passage, said elongate conduit being mounted in said housing for pivoting movement about its longitudinal axis through an arc defining different spraying positions in which said nozzles are aligned with or extend through said opening or said openings, and a conduit actuator operatively connected to said elongate conduit and adapted to move said elongate conduit relative to said housing through said arc, said first elongate housing being secured to one wing of the aircraft and extending substantially along its length and said second elongate housing being secured to the other wing and extending substantially along its length; and
    a controller mounted in or at least operable from the cockpit of the aircraft and operatively connected to said conduit actuator for controlling said conduit actuator.

17. An aircraft for aerial spraying including:
    a first spray boom and a second spray boom, each of said spray booms including an elongate conduit having a liquid supply passage therethrough and a plurality of spaced apart nozzles mounted thereto along its length and in fluid communication with said liquid supply passage, and a flow control valve at a predetermined position along said elongate conduit for opening and closing said passage and controlling the flow of liquid through said liquid supply passage to a selected downstream portion of said boom, and a conduit actuator operatively connected to said flow control valve for opening and closing said valve, said first spray boom being secured to one wing of the aircraft and extending substantially along its length and said second spray boom being secured to the other wing and extending substantially along its length;
    a controller operable from the cockpit of the aircraft operatively connected to said valve actuator for controlling said valve actuator.

18. An aircraft including:
    a first spray boom and a second spray boom, each of said spray booms including an elongate housing having an opening or a plurality of spaced apart openings substantially along its length, and an elongate conduit having a liquid supply passage therethrough and a plurality of spaced apart nozzles mounted thereto along its length and in fluid communication with said liquid supply passage, said elongate conduit being mounted in said housing for pivoting movement about its longitudinal axis through an arc defining different spraying positions in which said nozzles are aligned with or extend through said opening or said openings, and a flow control valve at a predetermined position along said elongate conduit for controlling flow of liquid through said liquid supply passage to a selected portion of said boom, and a conduit actuator operatively connected to said elongate conduit and adapted to move said elongate conduit relative to said housing through said arc, and a valve actuator operatively connected to said flow control valve for opening and closing said valve, said first elongate housing being secured to one wing of the aircraft and extending substantially along its length and said second elongate housing being secured to the other wing and extending substantially along its length;
    a controller operable from the cockpit of the aircraft operatively connected to said conduit actuator and said valve actuator for controlling said conduit actuator and said valve actuator.

19. An aircraft according to claim 18 including a third spray boom mounted under the fuselage and extending generally across its width, said third spray boom including an elongate conduit having a liquid supply passage therethrough and a plurality of spaced apart nozzles mounted thereto along its length and in fluid communication with said liquid supply passage.

20. An aircraft for aerial spraying including:

a first spray boom, a second spray boom and a third spray boom, each of said spray booms including an elongate conduit having a liquid supply passage therethrough and a plurality of spaced apart nozzles mounted thereto along its length and in fluid communication with said liquid supply passage, said first spray boom being secured to one wing of the aircraft and extending substantially along its length, said second spray boom being secured to the other wing and extending substantially along its length and said third spray boom being mounted below the fuselage of the aircraft and extending generally across its width;

a flow control valve operatively connected to the elongate conduit of said third spray boom for controlling flow of liquid to said third boom and a valve actuator operatively connected to said flow control valve for opening and closing said valve;

a controller operable from the cockpit of the aircraft operatively connected to said valve actuator for controlling said valve actuator, wherein said valve actuator is a linear actuator which is located adjacent one end of the conduit and is connected to said flow control valve by an actuator shaft or rod mounted in the conduit.

21. An aircraft according to claim 19, wherein said controller is adapted to control the valve actuators and the conduit actuators of all spray booms.

22. An aircraft according to claim 16, wherein said control valve actuator is a linear actuator which is located adjacent one end of the conduit and is connected to said flow control valve by an actuator shaft or rod mounted within said conduit.

23. An aircraft according to claim 22, wherein said flow control valve includes a valve member mounted in a housing and adapted to move linearly in the direction of the conduit axis to engage and disengage with a seat in the housing to shut and open said flow passage.

24. An aircraft according to claim 16, wherein said controller is operated by computer software in response to data derived from a ground positioning system and/or weather parameters.

25. An aircraft according to claim 24, wherein said weather parameters include true wind speed, wind direction, ambient humidity and ambient temperature.

26. An aircraft according to claim 25 wherein said controller is also adapted to be operated manually.

27. A method of controlling aerial crop spraying with an aircraft according to claim 19 having first, second and third booms, including:

providing data relating to performance criteria of the nozzles of said first, second and third booms over a range of nozzle angles and true wind speed;

selecting a desired nozzle performance;

measuring true wind speed of the aircraft while spraying;

determining the nozzle angle required to achieve the desired nozzle performance at the measured wind speed; and adjusting the angle of the conduit to the angle determined.

28. A method of controlling aerial crop spraying with an aircraft according to claim 19 having first, second and third booms, including:

determining the direction of the cross wind; and maintaining said flow control valve of said third spray boom open while the aircraft is travelling in one direction and maintaining said flow control valve closed while travelling in the other direction.

29. A method according to claim 28, including automatically opening and closing said flow control valve in response to the aircraft turning through a predetermined angle.

30. A method according to claim 28, including opening and closing said flow control valve in response to data from a ground positioning system.

31. A computer program adapted to carry out the method according to claim 27.

32. A computer program according to claim 31 including:

means for selecting a desired nozzle performance from a first data structure representing performance criteria of a nozzle of at least one of said first and second spray booms (and third spray boom where provided) for a range of nozzle angles and true wind speeds;

means for determining the nozzle angle required to achieve the desired nozzle performance at a measured true wind speed from said first data structure; and means for causing the conduit actuator of said spray boom to adjust the angle of said spray boom to achieve the nozzle angle determined to achieve the desired nozzle performance.

33. A computer program according to claim 31 including:

means for inputting a selected direction of travel of the aircraft;

means for inputting a predetermined deviation of the aircraft from the selected direction; and means for causing the valve actuator of one or both of said first and second spray booms to open or close in response to a deviation from the selected direction by at least the predetermined deviation.

34. A computer program according to claim 31 including:

means for inputting a selected direction of travel of the aircraft;

means for inputting a predetermined deviation of the aircraft from the selected direction; and means for causing the valve actuator of said third spray boom to open or close in response to a deviation from the selected direction by at least the predetermined deviation.

35. A computer program according to claim 31 including:

means for inputting a selected direction of travel of the aircraft;

means for inputting a predetermined deviation of the aircraft from the selected direction;

means for causing the valve actuator of one or both of said first and second spray booms to open or close in response to a deviation from the selected direction by at least the predetermined deviation; and means for causing the valve actuator of said third spray boom to open or close in response to a deviation from the selected direction by at least the predetermined deviation.

36. A computer program according to claim 31 including means for receiving and processing data from a ground positioning system whereby the direction of travel and deviation from the direction of travel can be determined by reference to said data.

* * * * *